United States Patent [19]

Caram

[11] Patent Number: 5,245,607
[45] Date of Patent: Sep. 14, 1993

[54] DATA NETWORK MESSAGE BROADCAST ARRANGEMENT

[75] Inventor: Bruce E. Caram, Branchburg, N.J.

[73] Assignee: AT&T Bell Laboratories, Murray Hill, N.J.

[21] Appl. No.: 488,187

[22] Filed: Mar. 5, 1990

[51] Int. Cl.[5] .............................................. H04L 12/56
[52] U.S. Cl. ................................... 370/94.1; 370/94.3
[58] Field of Search ............................ 370/94.1, 94.3; 364/200

[56] References Cited

U.S. PATENT DOCUMENTS

| | | | |
|---|---|---|---|
| 4,251,861 | 2/1981 | Mago | 364/200 |
| 4,412,285 | 10/1983 | Neches et al. | 364/200 |
| 4,466,060 | 8/1984 | Riddle | 364/200 |
| 4,740,954 | 4/1988 | Cotton et al. | 370/60 |

OTHER PUBLICATIONS

*Performance of Data Communication Systems and their Applications,* "Distributed Minimal Spanning Tree Algorithms", D. S. Parker, Jr. et al, pp. 45–54.
*IEEE* 1981, CH 1632-9/81/0000, "Adaptive Distributed Minimal Spanning Tree Algorithms", D. S. Parker, Jr. et al, pp. 138–144.
*IBM Technical Disclosure Bulletin,* vol. 26, No. 6, Nov. 1983, "Minimum Spanning Tree Approximation for Multi-Destination Routing", K. Bharath-Kumar et al, pp. 3063–3067.
*IEEE* 1989 CH2706-0/89/0000/0110, "Low Cost Algorithms for Message Delivery in Dynamic Multicase Groups", N. E. Belieir et al, pp. 110–117.

*Primary Examiner*—Douglas W. Olms
*Assistant Examiner*—T. Samuel
*Attorney, Agent, or Firm*—F. B. Luludis

[57] ABSTRACT

A facility is provided in a data network to prevent a so-called connectionless broadcast message from flooding the network as a result of each network node retransmitting such messages to its neighboring nodes even though a neighboring node may have received them from another neighbor. Specifically, a node x that receives a connectionless broadcast message retransmits the message to a neighboring node y only when node x finds that it is closer to the source of the message than node y is including any other neighbor of node y.

11 Claims, 6 Drawing Sheets

100

100

| | HEADER | | | | | | | | SA | | | |
|---|---|---|---|---|---|---|---|---|---|---|---|---|
| | S | D | T | 0 | 1 | 2 | 3 | 4 | | 6 | 7 | 8 ----- |
| 301 | 2 | 0 | R | # | — | 0 | — | — | | 8 | 5 | 2 | 2 ----- |
| 302 | 5 | 0 | R | # | — | 8 | — | — | | 0 | 5 | 2 | 5 ----- |
| 303 | 6 | 0 | R | # | — | 8 | — | — | | 6 | 0 | 2 | 5 ----- |

FIG. 5  NODE 1 ROUTING TABLE

501

| LINK | ACTION | NODES |
|---|---|---|
| 102 | RECEIVE | 2, 7, 8 | — 502
| 102 | TRANSMIT | 1, 5, 6 | — 503
| 105 | RECEIVE | 5 | — 504
| 105 | TRANSMIT | 1, 2, 7 | — 505
| 101 | RECEIVE | 6 | — 506
| 101 | TRANSMIT | 1, 2, 7 | — 507

FIG. 6  NODE 2 ROUTING TABLE

601

| LINK | ACTION | NODES |
|---|---|---|
| 102 | RECEIVE | 1, 5, 6 | — 602
| 102 | TRANSMIT | 2, 7, 8 |
| 107 | RECEIVE | 8 |
| 107 | TRANSMIT | 1, 2, 7 |
| 103 | RECEIVE | 7 |
| 103 | TRANSMIT | 1, 2, 5, 6, 8 | — 603

DATA NETWORK MESSAGE BROADCAST ARRANGEMENT

FIELD OF THE INVENTION

The invention relates to data communications networks and more particularly relates to routing a message in such networks.

BACKGROUND OF THE INVENTION

A common failure in the provision of connectionless service in a network of communications nodes arranged in an arbitrary topology is the inability to route, in an efficient manner, a broadcast message from a source node to each of the other nodes. For example, in one prior arrangement, broadcasting is done by arranging the source node so that it sends a copy of the broadcast message to each of the other nodes in the network. Although this arrangement achieves the desirable goal of sending only a single copy of a broadcast message to each node, it, nevertheless, does not make efficient use of the network bandwidth, since multiple copies of the broadcast message may travel over the same route(s) to reach intended destinations.

SUMMARY OF THE INVENTION

The prior art of routing connectionless broadcast messages in a network of nodes of an arbitrary topology is advanced by arranging each network node so that it forwards a message to a neighboring node only when a number of predefined conditions are found to be true. Specifically, a node X forwards a message to its neighboring node Y only if node X is closer to the source of the message than node Y is, including any other neighbor of node Y. In the event that the conditions are also true for at least one other neighbor Z of node Y, then, based on a predetermined factor, only one of the nodes X or Z transmits the message to node Y. For example, of nodes X and Z, the one having the lowest numbered network address transmits the message to node Y.

BRIEF DESCRIPTION OF THE DRAWING

In the drawings:

FIG. 5 illustrates a routing table that is derived, in accord with the invention, from the spanning trees of FIG. 4;

FIG. 6 illustrates another example of a routing table;

DETAILED DESCRIPTION

Figure 1:
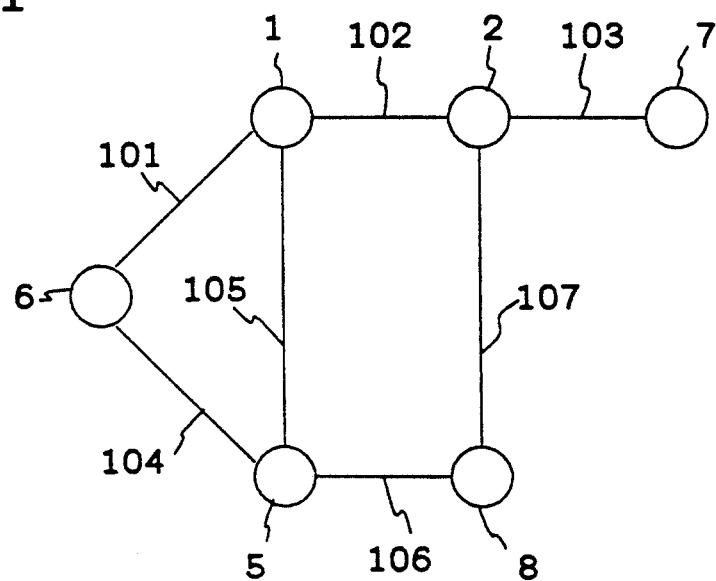
FIGS. 1 and 2 are block diagrams of communications networks and are useful for discussing the principles of the invention.

FIG. 1 shows in block diagram form a data network comprising a plurality of nodes 1 and 2 and 5 through 8 interconnected via respective communication links (paths) 101 through 107. As will be shown below, each of the nodes may be a so-called local area network (LAN) in which data modules contained in a LAN, for example, the LAN represented by node 1, may exchange data messages with one another. In addition, a module may exchange messages with a module contained in another node, for example, node 8. In the operation of a data network, it is often the case that a data module may broadcast a message to its associated modules and to the modules contained in each of the other nodes. As mentioned above, a node may be arranged so that it routes to the other nodes in the network each broadcast, or connectionless, message that it receives to ensure that all of the nodes receive the message. In such an instance, a node may receive the same broadcast message several times. As a result, the broadcast message floods the network, thereby causing the transmission of other messages to be delayed.

In my arrangement, a node receives a broadcast message only once. Specifically, in my arrangement a node, for example, node 1, forwards a broadcast message that it receives to its neighboring nodes, for example node 2, only if node 1 finds that, in accordance with the invention, (a) it is closer to the source of message than node 2 and (b) of all of the neighbors of node 2, node 1 is the closest to node 2 from the source of the broadcast message. For example, if node 1 receives a broadcast message originated by node 6 via link 101, then node 1 would forward (re-transmit) the broadcast message over link 102 that is connected to node 2. Node 1 would do so since it is closer to the source of the broadcast message, e.g., node 6, than node 2 is, and of all of the neighbors of node 2, e.g., nodes 7 and 8, node 1 is closest to node 2 from the source. When node 2 receives the broadcast message it would not forward the message to node 8, since node 2 "knows" that it is not closer to the source of the message that node 8 is. In the latter case, node 5 would forward the broadcast message to node 8, since of all of the neighbors of node 8, node 5 is closer, by one link, to the source of the message than node 2 is.

In addition, node 1 would not forward a node 6 broadcast message to node 5. The reason for this is that nodes 1 and 5 are equally distant (i.e., comprising single links 101 and 104, respectively) from node 6. Thus, node 6 would transmit the broadcast message to both nodes 1 and 5.

(Herein the term "distance" and variants of that term is taken to mean the number of links that a node is from the source of a message. It will also be taken to mean the "weight" of such a path, in which each link in a path is assigned a unit weight, or hop, based on predetermined conditions associated with the respective link. Thus, a link could be assigned a weight of one, whereas another link could be assigned a weight of two as a result of their respective propagation delays. Accordingly, the weight, or distance, of a particular path will be taken to mean the sum of weights of links that make up the path. As such, the terms "distance" and "weight of a path" will be used interchangeably.)

Figure 2:
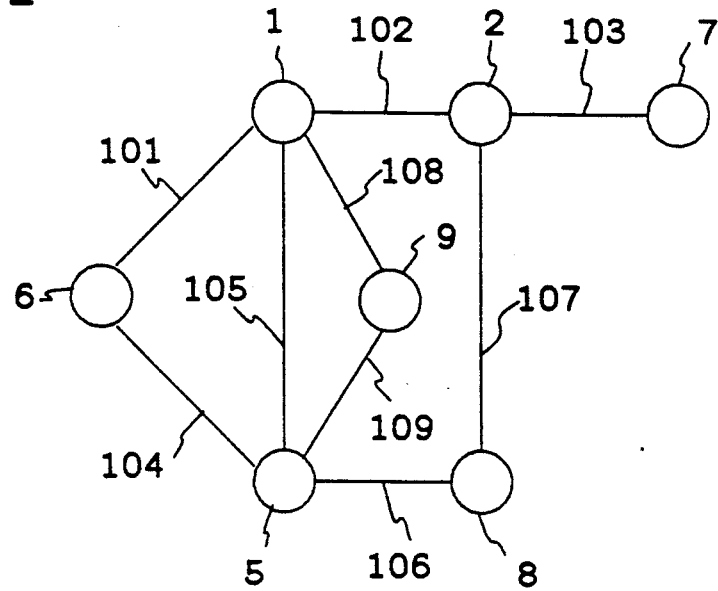

As a further example, reference is made to FIG. 2 showing the network of FIG. 1 with the addition of node 9 connected to nodes 1 and 5 via links 108 and 109, respectively. Assuming that node 9 is the originator of a broadcast message, then node 9 would forward the message to both nodes 1 and 5. It is seen from the FIG. that both nodes 1 and 5 are equally distant from node 9 and are also equally distant from node 6. Accordingly, the conditions which control whether or not a node forwards a broadcast message to a neighboring node, i.e., node 6, applies equally well to both nodes 1 and 5. Thus, the issue arises as to which one of the nodes 1 or 5 assumes the responsibility to transport a node 9 broadcast message to node 6 to ensure that node 6 receives the message only once. In such situations, the decision as to which one of the nodes would forward the broadcast message to node 6 is handled by, in accordance with an aspect of the invention, using a parameter that is common among the network nodes. For example, one common parameter is the identity of the node, in which the nodes are identified by respective network switch numbers. Thus, in a situation where the conditions (rules) pertain equally well to a number of nodes, then, in accordance with the aforementioned aspect of the invention, the node having—illustratively the lowest network switch number—would forward the broadcast message. Accordingly, then, upon receipt of the node 9 message, node 1, rather than node 5, would forward the message to node 6, since the network switch number assigned to node 1 (i.e., the value of 1) is lower than the network switch number assigned to node 5 (i.e., the value of 5).

It can be readily appreciated that such a decision could be based on the opposite case in which the node having the higher switch number would have the responsibility of forwarding a broadcast message.

The decision as to whether a node forwards a broadcast message to its neighbor is based on a routing table that the node constructs in accordance with the principles of the invention and in accordance with its knowledge of the topology of its associated network, in which such topology may be arbitrary and changing from time to time. To obtain such knowledge, a node may employ one of a number of well-known methods, each designed to provide a node with the necessary knowledge that it needs to dynamically formulate a routing table. In an illustrative embodiment of the invention, each node in a network employs a method commonly referred to as exclusionary minimum spanning trees to determine the topology of the associated network, which is disclosed in U.S. Pat. No. 4,466,060 issued Aug. 14, 1984 to G. G. Riddle, and which is hereby incorporated by reference.

Briefly, in the G. G. Riddle arrangement, neighboring nodes exchange messages describing the links which interconnect certain ones of the nodes including the node that is transmitting the message, but excluding the links associated with the node that is to receive the message. Thus, in the case of node 1 of FIG. 1, node 1 receives from each of its neighboring nodes 2, 5 and 6 a message describing an exclusionary spanning tree in which each of the latter nodes is positioned at the root of its respective tree. Node 1, in turn, constructs a routing table from the received messages in accord with the principles of the invention. An illustrative format of the messages describing such exclusionary trees are shown FIG. 3.

Specifically, the format of a routing message comprises, inter alia, a header followed by a data field. The header of each message is composed of a number of fields, including S, D and T fields. The S field identifies the source (sender) of a message. In the present illustrative example, the S field of messages 301 through 303 identifies nodes 2, 5 and 6, respectively. The next field, the D field, identifies the recipient of the message. A zero (0) in the D field indicates that the message is intended for the first node that receives the message, e.g., node 1. The T field identifies the message type. An R in that field indicates that the message is a routing message. The SA (service area) field describes the exclusionary minimum spanning tree, in which the SA data field is an ordered sequence of numbers representing the exclusionary minimum spanning tree that is relative to the node that is sending the message. The originator is also identified by the location of a zero in the SA field. The values contained in the remaining data positions identify the parents of the nodes identified by the byte order of field SA. Thus, for message 301, the value of 2 in data positions 7 and 8 indicate that node 2 is the parent of both nodes 7 and 8, relative to the exclusionary tree sent to node 1 by node 2. The values of 8 and 5 respectively in data positions 5 and 6 of message 301 indicate that the parents of nodes 5 and 6 are node 8 and 5, respectively, relative to node 2. Messages 302 and 303 contain similar information relative to the respective exclusionary trees sent to node 1 by nodes 5 and 6.

Figures 3, 4:
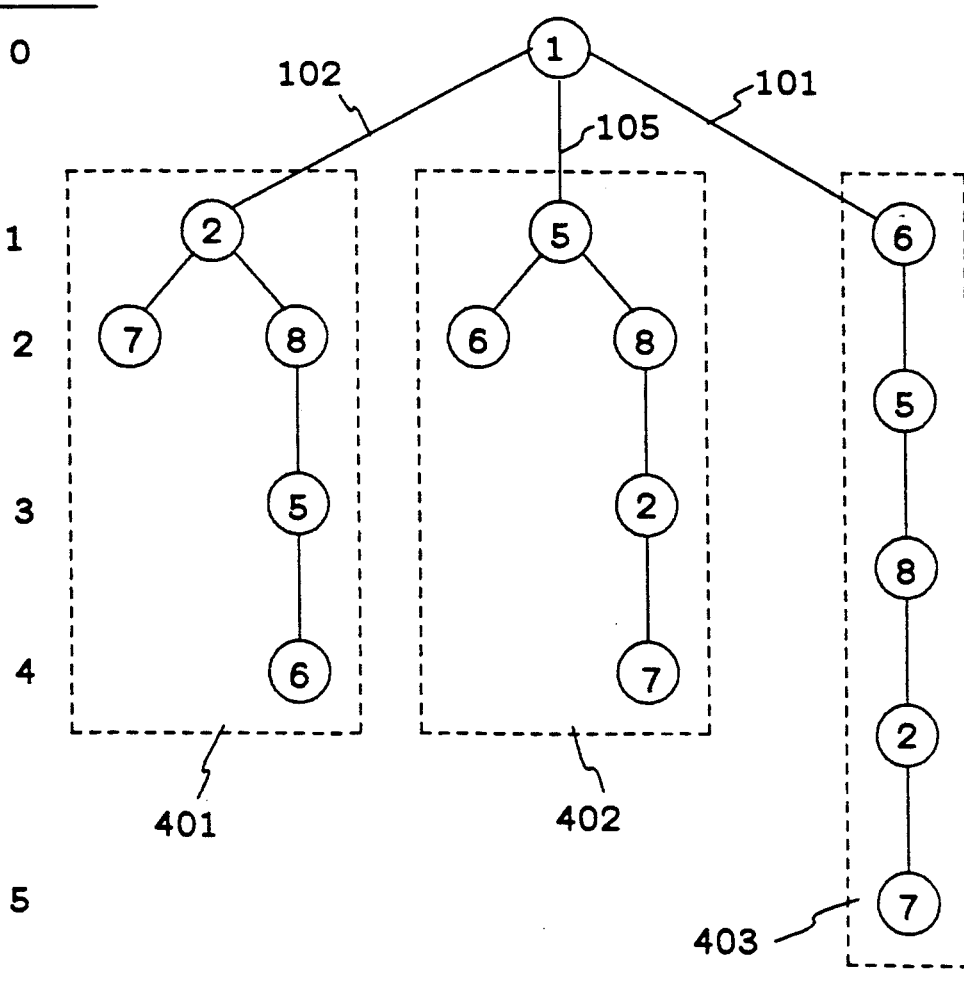
FIG. 3 shows the format of messages that may be used in an illustrative embodiment of the invention to transmit so-called exclusionary minimum spanning tree information among network nodes, e.g., the nodes of FIGS. 1 and 2.
FIG. 4 illustrates exclusionary minimum spanning trees derived from the information contained in the messages of FIG. 3.

A graphical representation of the exclusionary minimum spanning trees described by messages 301 through 303 is shown in FIG. 4. Based on the exclusionary minimum spanning trees and employing the principles of the invention, node 1 constructs a routing table as shown in FIG. 5. Node 1 uses the table to control the routing of connectionless broadcast messages to destination nodes.

Specifically, and referring to both FIGS. 1 and 5, routing table 501 indicates at line 502 that node 1 accepts broadcast messages received via link 102 only if the broadcast messages are originated by nodes 2, 7 or 8, and rejects all other broadcast messages. For example, if node 1 receives via link 102 a broadcast message originated by 5, then node 1 would reject the message. In addition, table 501 indicates at line 503 that node 1 would transmit over link 102 broadcast messages originated by nodes 1, 5 or 6, in which such messages may be received over one of the other links, 105 or 101. Similarly, and as indicated at line 504, node 1 accepts broadcast messages received via link 105 only if the messages are originated by node 5, and transmits over link 105 broadcast messages that are originated by node 1, 2 or 7 only, as indicated at line 505. For link 101, the table indicates at line 506 that node 1 accepts broadcast messages received via link 101 if the messages are originated by node 6, and transmits over link 101 only those broadcast messages originated by nodes 1, 2 or 7, as indicated at line 507.

For example, if node 1 receives via link 101 a broadcast message originated by node 6, then node 1 accepts the message in accordance with table 501 and places the message on its internal bus (not shown). Node 1 circuits associated with links 101, 102 and 105 and having a copy of their corresponding lines of table 501 stored therein monitor the bus and read the messages that are contained thereon. The node 1 circuit associated with links 101, 105 examines the broadcast message originated by node 6 from the bus, but discard the messages, since, in accordance with their respective lines 506–507 and 504–505 of table 501, a broadcast message originated by node 6 is not transmitted over links 101 and 105. The node 1 circuit associated with link 102, on the other hand, would remove the broadcast message from the internal bus and transmit the message over link 102, as specified by lines 502 and 503 of table 501. Thus, as originally discussed above in connection with FIG. 1, node 1 transmits node 6 broadcast messages to node 2, but not to node 5. Accordingly, the principles of the invention governing the routing of broadcast messages are embodied within the routing specified by table 501.

As mentioned above, a node, e.g., node 1, constructs its associated routing table in accordance with the principles of the invention and in accordance with its knowledge of the topology of the associated network. The way in which a node constructs such a table will now be briefly discussed in connection with FIGS. 4 and 5 as they apply to illustratively node 1.

In particular, node 1 determines, using the trees of FIG. 4, the weight of a first path from node 1 to another node (AN), for example node 2, and the weight of a second path from a particular one of its neighboring nodes (NN), for example, node 5, to the other node 2 without going through node 1 but going through some other node (ON), for example, node 8. Node 1 then compares the weight of the second path with the weight of the first path plus 1, where the plus one represents the weight of the path from node 1 to the particular neighbor. In this instance, node 1 would find that weights are equal. However, node 1 would determine that it should accept a broadcast message originated by node 2 via link 102, and that is should transmit over link 105 a broadcast message originated by node 2, since the value of the node 1 address is less than the value of the node 8 address (i.e., 1<8). As another example, if node 1 assumes that the neighbor is node 6 (NN) and that the second path goes through node 5 (ON), then node 1 would find that the weight of the second path is greater than the weight of the first path plus 1. As a result of that finding, node 1 would conclude, and record at line 507 of table 501, that it should transmit over link 101 messages originated by node 2.

As still another example, if node 1 assumes that the neighbor is node 2 (NN), that the originator of the message is node 6 (AN) and that the second path goes through node 5 (ON), then node 1 would determine that the weight of the first path plus 1 is less than the weight of the second path. Accordingly, node 1 would conclude, and record at line 503 of table 501, that it should transmit over link 102 messages originated by node 6. Similarly, node 1 would conclude, and record at line 506 of table 501, that it should receive over link 101 messages originated by node 6. Node 1 would continue to apply the foregoing procedure to the trees shown in FIG. 4 until it completes the construction of table 501, i.e., "filling in" lines 502 through 507, as will be explained below in further detail. Node 1 then stores the corresponding lines of the table in the respective node 1 circuits that interface with individual ones of the links 101, 102 and 105.

Node 2 also receives from its neighbors, namely, nodes 1, 7 and 8, routing messages (not shown) detailing respective exclusionary minimum spanning trees. Similarly, node 2, using the received trees, constructs a node 2 routing table, as shown in FIG. 6. It is seen that in accordance with the routing information specified at line 602, node 2 accepts a broadcast message received via link 102 only when the message is originated by node 1, 5 or 6. An inspection of table 601 indicates that a broadcast message originated by node 6 is transmitted by node 2 over link 106 only, as indicated at line 603. A further inspection of table 601 reveals that node 2 does not transmit such messages over link 107 connected to node 5. Thus, it can be appreciated that each network node routes a broadcast message in accord with its respective routing table as constructed in accordance with the principles of the invention.

Figure 7:
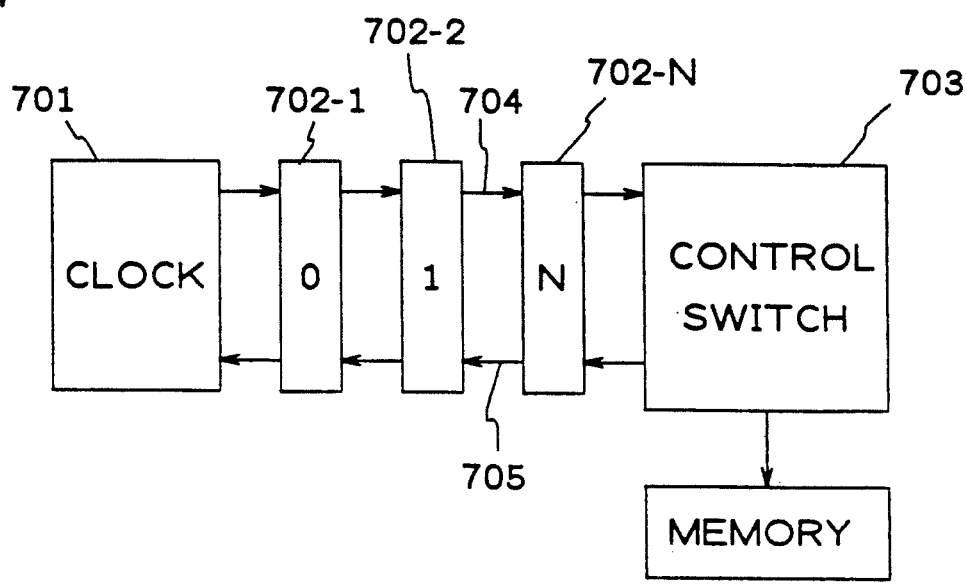
FIG. 7 is a block diagram of a communications node which may be arranged to embody the principles of the invention.

Turning now to FIG. 7 there is shown a data node 700 which may serve as any one of the nodes shown in FIGS. 1 and 2. Node 700 may be, for example, the well-known Datakit virtual circuit switch, which is available from AT&T. Briefly, node 700 comprises a plurality of circuit modules and a so-called printed wire backplane equipped with connectors for respectively receiving clock module 701, circuit (port) modules 702-1 through 702-N and switch module 703. The printed wire backplane implements a contention bus 704 and a broadcast bus 705. The backplane also provides signal distribution from clock module 701 to the other modules.

A module, e.g., module 702-1, that is plugged into a backplane connector is automatically connected to buses 704 and 705. Bus 704 operates to transport to control switch module 703 a data message placed on bus 704 by one of the port modules. Bus 705, on the other hand, operates to transport a data message from switch module 703 to the port modules 702-0 through 702-N monitoring bus 705. Control of bus 704, which is based on a priority contention scheme employing module number, is implemented in each of the port modules 702-1 through 702-N. Thus, a port module, e.g., port 702-1, contends for control of the bus to send a message to another port module, e.g., port 702-2. When it gains such control, the sending port may then place on bus 704 a packet defining a message. Control switch 703, upon receipt of the message, establishes a connection between the source and recipient using what is commonly referred to as a routing control memory.

Individual ones of the port modules may serve, inter alia, a link to another node, such as one of the links depicted in FIGS. 1 and 2. Thus, a port serving a link that receives and accepts a broadcast message via its associated link places the message on bus 704 for transport to switch 703, which then places the message on bus 705. Since, as mentioned above, each of the port modules monitor bus 705, then another one of the link modules, other than the receiving module, may remove the message from bus 705 in accord with its routing table and transmit the message over a link that it is serving.

Figure 8:
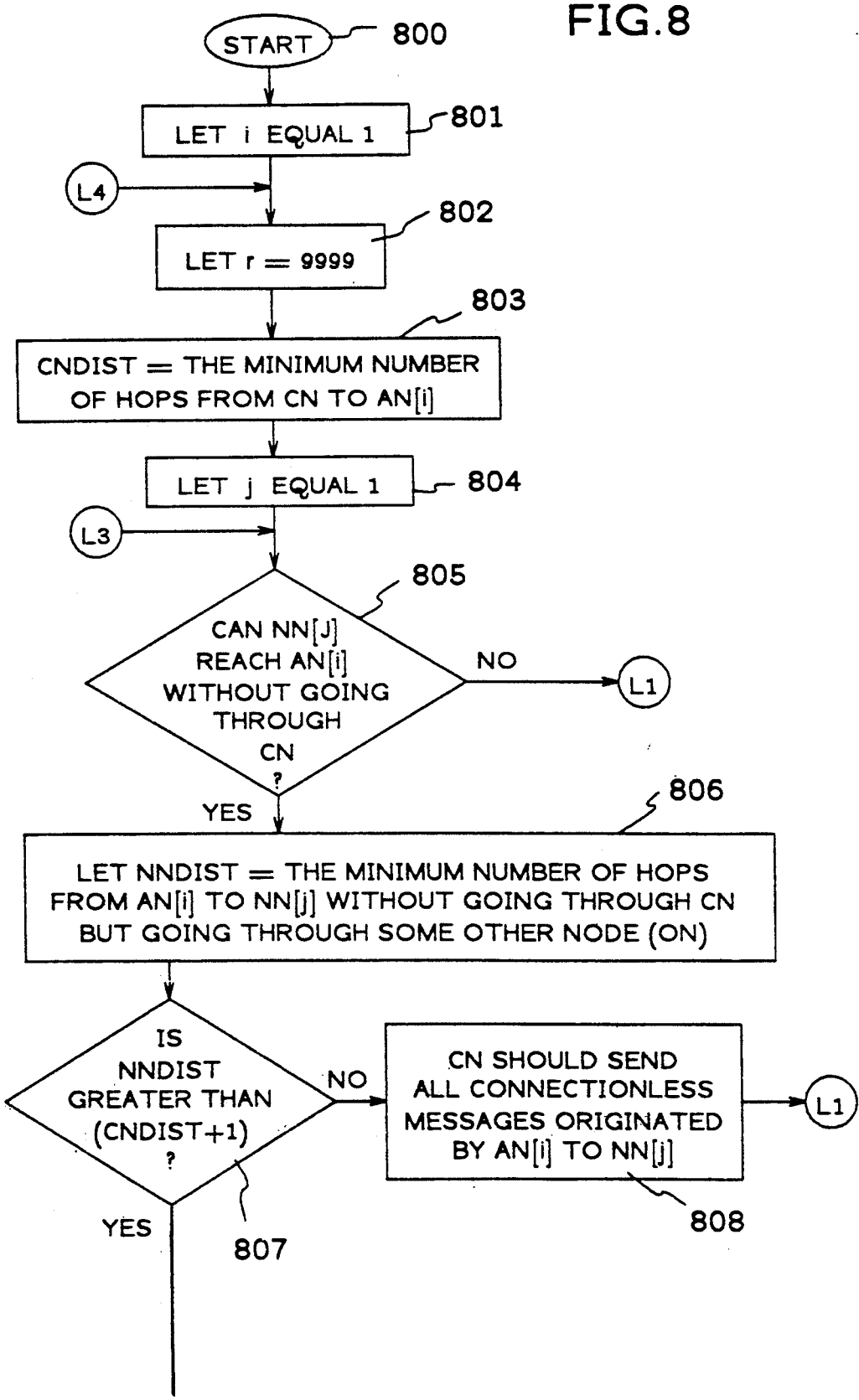
FIGS. 8-10, when arranged in accordance with FIG. 11, illustrate a flow chart of the program which carries out the principles of the invention and which may be stored in the node of FIG. 7.
Figure 9:
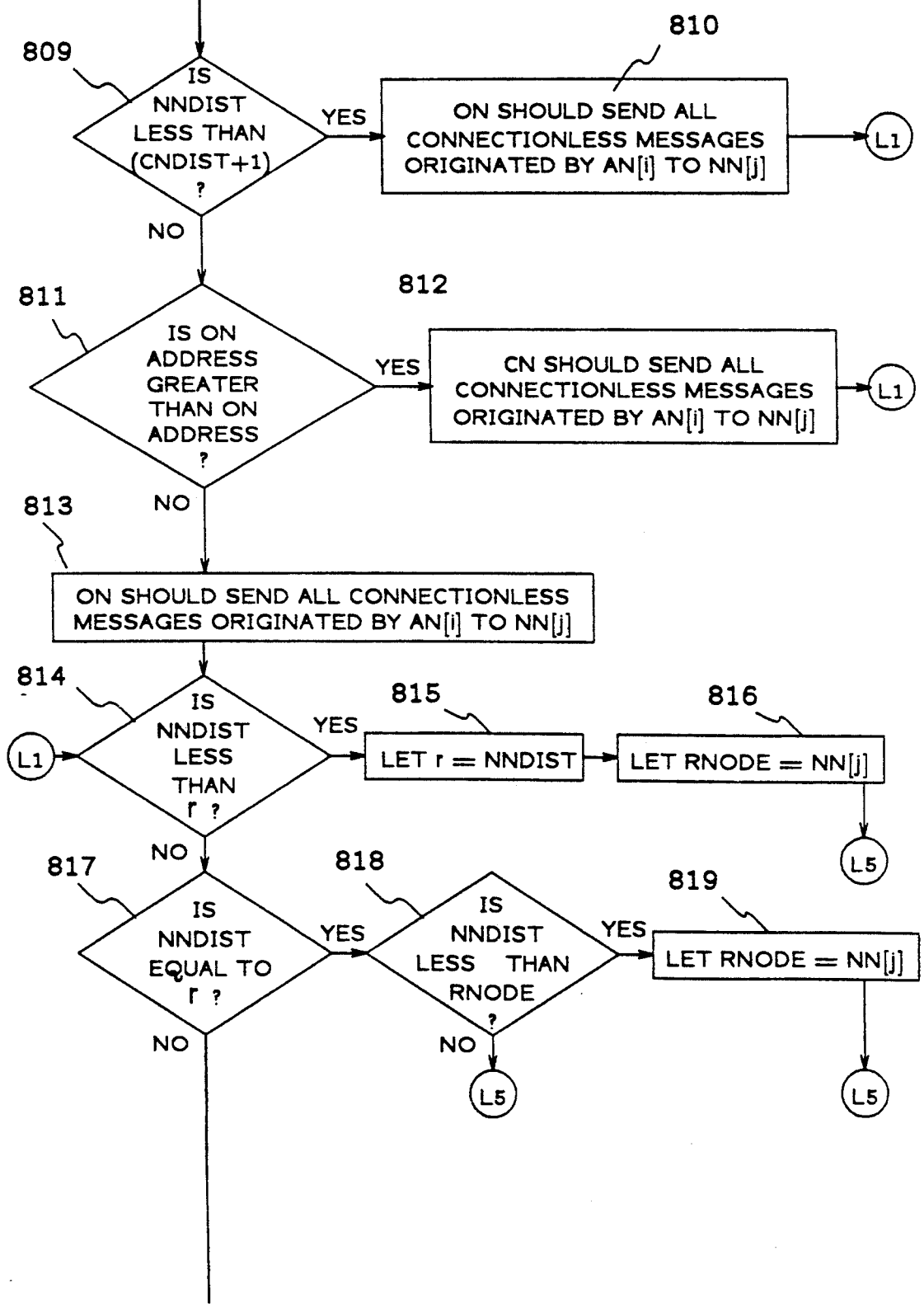
Figure 10:
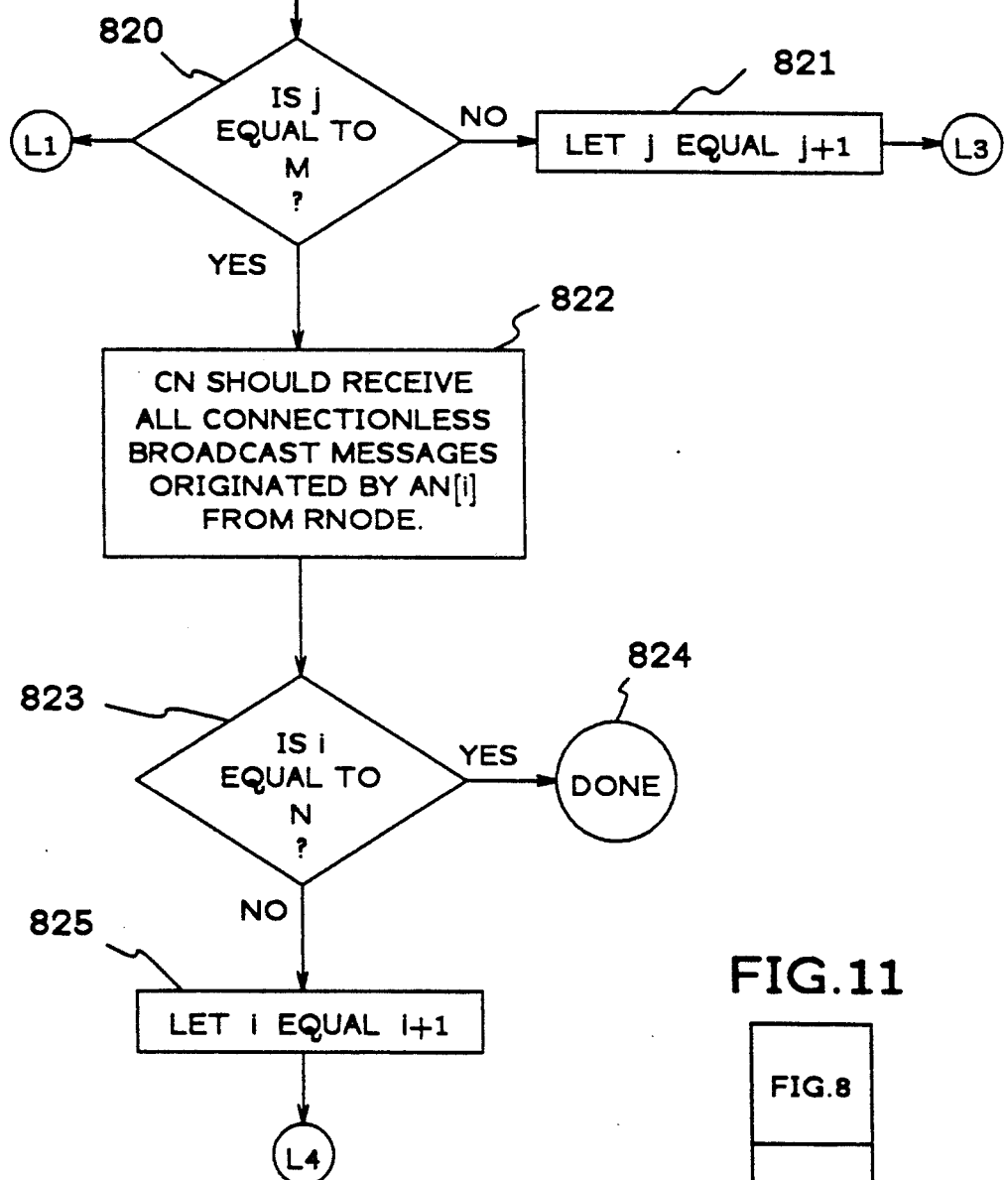
Figure 11:
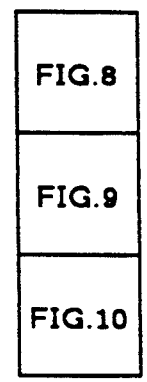

Turning now to FIGS. 8-10, which when arranged as shown in FIG. 11, illustrate a flowchart of the program which implements the invention in each of the network nodes. In the following discussion, it is assumed that a node, which will be referred to as the Current Node (CN), has received from the other network nodes respective exclusionary minimum spanning trees and then invoked a program to construct the associated routing table. It is also assumed that there are N Active Nodes (AN) in the network, other than the current node and the current node has M Neighboring Nodes (NN), where M and N are $\geq 1$.

Specifically, when the program is entered at block 800 it proceeds to block 801 where it sets a loop variant "i" equal to one for the first active node. (It is noted that program has been coded using nested IF/ELSE statements.) When the program completes its task at block 801 it then proceeds to block 802, where it sets a parameter "r" equal to an arbitrary value—illustratively 9999—representing a value that should be greater than the weight (number of hops) of any path that the program may encounter. The program then proceeds to block 803 where it processes the exclusionary minimum spanning trees. That is, the program selects an active node AN [i] and then determines the minimum weight (CNDIST) of the path between CN and AN [i]. The program then proceeds to block 804 where it sets a second loop variant "j" equal to one representing the first neightbor node. The program then proceeds to block 805.

At block 804, the program determines if one of its neighboring nodes NN [j] can reach node AN [i] without going through CN. If the program finds that is not the case, then it proceeds to block 814 of FIG. 9. Otherwise, the program proceeds to block 806. At block 806, the program determines the shortest path (NNDIST) between its neighboring node NN[i] and node AN[j], in which the path includes some Other Node (ON), but not node CN. The program then proceeds to block 807 where it compares the value of NNDIST with the value of CNDIST+1, and proceeds to block 808 if it finds that the former value is greater than the latter value. Otherwise, the program proceeds to block 809 of FIG. 9. At block 808, the program concludes that it should send all connectionless broadcast messages originated by node AN[i] to node NN[j], and records that conclusion in its associated routing table, in the manner discussed above. The program then proceeds to block 814 of FIG. 9.

At block 809 of FIG. 9, the program again compares the value of NNDIST with the value of CNDIST+1, and proceeds to block 810 if it finds that the former value is less than the latter value. Otherwise, the program proceeds to block 811. At block 810, the program concludes that node ON should send broadcast messages originated by node AN[i] to node N[j] and then proceeds to block 814.

At block 811, the program compares the value of the aforementioned common parameter, e.g., address, assigned to node ON with that assigned to node CN, and proceeds to block 812 if the former value is greater than the latter value. Otherwise, the program proceeds to block 813. At block 812, the program concludes that the current node should send to node NN[j] all connectionless broadcast messages originated by node AN[i], and records that conclusion in its associated routing table in the manner discussed above.

At block 813, the program concludes that node ON should send to node NN[j] all connectionless messages broadcast originated by node AN[i]. The program then proceeds to block 814.

It is noted that blocks 814 through 819 represent a section of the program which sets the stage for the program to determine whether or not it should receive connectionless broadcast messages from node AN[i]. Specifically, at block 814, the program proceeds to block 815 if it finds that the value of the current NNDIST is less than the value of parameter r. Otherwise, it proceeds to block 817. At block 815, the program sets parameter r to the value of the current NNDIST and proceeds to block 816 where it sets Rnode equal to the identity (address) of the current neighboring node NN[j]. The program then proceeds to block 820.

At block 817, the program proceeds to block 818 if it finds that the value of the current NNDIST is equal to the current value of parameter r. Otherwise, it proceeds to block 821. At block 818, the program proceeds to block 819 if it finds that the value of the address assigned to the current NN[j] is less than the current value of Rnode. Otherwise, the program proceeds to block 820. At block 819, the program sets Rnode equal to the address of the current NN[j] and then proceeds to block 820.

At block 820, the program compares the value of j with the value of M and proceeds to block 822 if if finds that the values are equal to one another. Otherwise, the program proceeds to block 821 where it increments the value of j by one and then proceeds to block 805 of FIG. 8 to determine whether node CN should send to its next neighboring node NN[j+1] connectionless broadcast messages originated by node AN[i].

At block 822, the program records in its associated routing table the fact that it should receive all connectionless broadcast messages from node AN[i] via the link associated with R node. The program then proceeds to block 823, where it compares the value of i with the value of the number of active nodes, and exits via block 824 if those values compare with one another. Otherwise, the program proceeds to block 825 where it increments the value of i and then proceeds to block 802. In this way, the program via an outer one of the IF statements selects nodes AN[i] through AN[N] one by one and then determines via the inner IF statements whether node CN should send to each of its neighboring nodes NN[j] through NN[M] connectionless broadcast messages originated by node AN[i]. Similarly, node CN determines whether or not it should receive for a node AN[i] connectionless broadcast messages.

The foregoing is merely illustrative of the principles of my invention. Those skilled in the art will be able to devise numerous arrangements, which, although not explicitly shown or described herein, nevertheless embody those principles that are within the spirit and scope of the invention.

I claim:

1. In a network comprising a plurality of nodes interconnected via respective links, an arrangement for transmitting a broadcast message received at a first one of said nodes to at least a second one of said nodes, said first node being a neighbor of said second node, said arrangement comprising
   means contained in said first node for receiving via an associated one of said links said message, said message being originated by a third one of said nodes, and
   means contained in said first node for transmitting said message to said second node when the number of links between said first and third nodes is less than the number of links between said second and third nodes and is less than the number of links between said third node and any other neighbor of said second node.

2. The arrangement set forth in claim 1 wherein said means for transmitting includes means operative when the number of links between said first and third nodes is equal to the number of links between said third node and at least one other neighbor of said second node for then transmitting said message to said second node if the value of a common parameter assigned to said first node is less than the value assigned to said at least one neighbor.

3. The arrangement set forth in claim 1 wherein said common parameter is an address.

4. The arrangement set forth in claim 1 wherein each of said nodes includes means for exchanging with one another messages characterizing respective exclusionary minimum spanning trees, said first node using the spanning trees that it receives from other ones of said nodes to determine each said number of links.

5. The arrangement set forth in claim 4 wherein said means for exchanging includes means for generating a respective routing table as a function of the contents of the messages received from other ones of said nodes, each of said nodes using its respective routing table to control the acceptance and transmission of messages originated by other ones of said nodes.

6. An arrangement for use in a network comprising a plurality of nodes, said arrangement comprising
   a plurality of links interconnecting respective ones of said nodes, each of said links having a respective weight,
   means contained in at least a first one of said nodes for receiving via a respective one of said links a broadcast message originated by a second one of said nodes, and
   means contained in at least said first node for transmitting to a third one of said nodes that is a neighbor of said first node said message when the sum of the weights of the minimum number of links between said first and second nodes is less than the sum of the weights of the minimum number of links between said second and third nodes and is less than the sum of the weights of the minimum number of links between said second node and any other neighbor of said third node.

7. The arrangement set forth in claim 6 wherein said means for transmitting includes means operative when the sum of the weights of the links between said first and second nodes is equal to the sum of the weights of the links between said second node and at least one other neighbor of said third node for then transmitting said message to said third node if the value of a common parameter assigned to said first node is less than the value assigned to said at least one neighbor.

8. The arrangement set forth in claim 7 wherein said common parameter is an address.

9. The arrangement set forth in claim 6 wherein each of said nodes includes means for exchanging with one another messages characterizing respective exclusionary minimum spanning trees, said first node using the spanning trees that it receives from other ones of said nodes to determine each said sum.

10. The arrangement set forth in claim 9 wherein said means for exchanging includes means for generating a respective routing table as a function of the contents of the spanning trees received from other ones of said nodes, each of said nodes using its respective routing table to control the acceptance and transmission of messages originated by other ones of said nodes.

11. A method of controlling the routing of a broadcast message in a network comprising a plurality of nodes interconnected via respective links, said message being originated by a source node and being received at least one other of said nodes, said one node having at least one neighboring node, said method comprising the steps of
   arranging said one node so that it determines the number of links x between itself and said source node and the number of links y between said neighboring node and said source node,
   arranging said one node so that it determines the number of links z between said source node and each other node that is also a neighbor of said neighboring node, and
   causing said one node to transmit said message to said neighboring node only if the value of x is less than the value of y and is less than the value of each z.

* * * * *